Jan. 17, 1961    F. WHITWORTH    2,968,314
DOME CONSTRUCTION FOR PRESSURE REGULATING DEVICE
Filed June 18, 1958
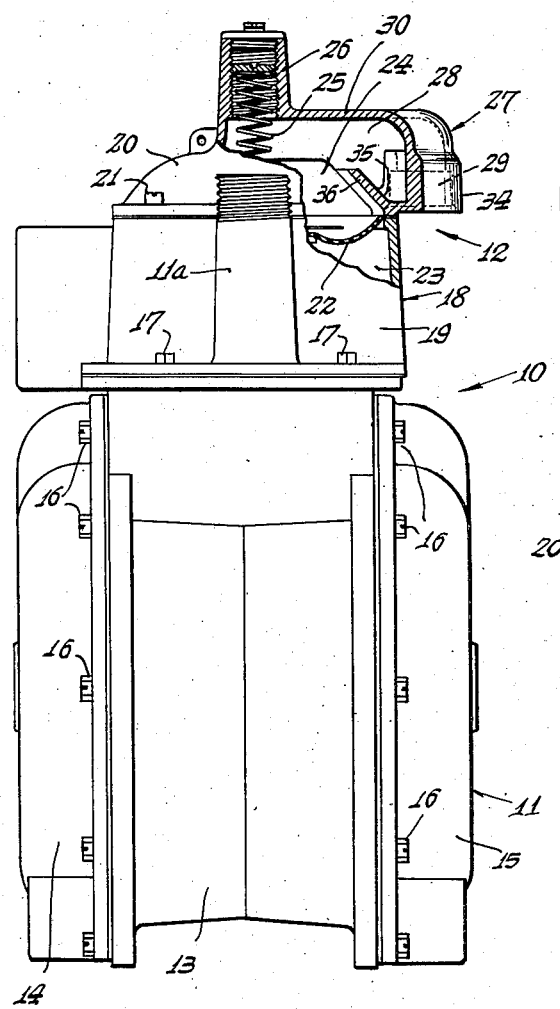
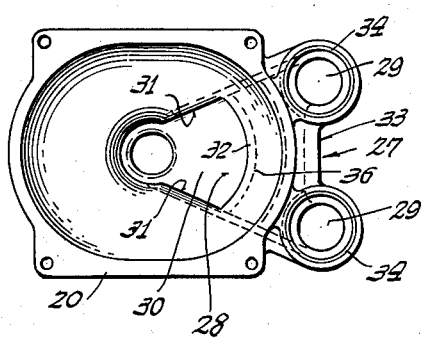
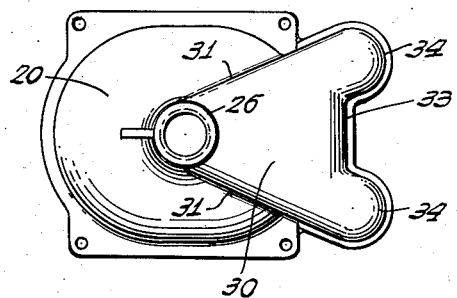
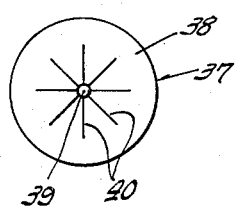
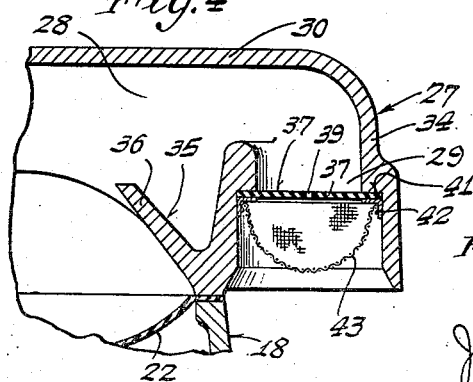
INVENTOR.
Fairchild Whitworth
BY
Johnson and Kline
ATTORNEYS

United States Patent Office 2,968,314
Patented Jan. 17, 1961

2,968,314

DOME CONSTRUCTION FOR PRESSURE REGULATING DEVICE

Fairchild Whitworth, Fairfield, Conn., assignor to The Sprague Meter Company, Bridgeport, Conn., a corporation of Connecticut Filed June 18, 1958, Ser. No. 742,903

4 Claims. (Cl. 137—493.9)

This invention relates to gas meters of the type which includes a meter casing and a pressure regulating device having a pressure chamber and venting chamber therein. More specifically, it pertains to a cover dome, for a pressure regulating device, which is adapted to close the venting chamber and vent the same to the atmosphere.

Heretofore, it has been the practice in manufacturing gas meters, including a meter casing and a pressure regulating device, to form the cover dome of the regulating device with means for removably attaching an outwardly extending venting conduit thereto for venting the venting chamber of the device. Due to the size (shape and location of the conduit attachment, relative to the basic structure of the meter, it has been found necessary to separately pack and ship the parts, or resort to expensive oversize shipping containers. In accordance with the procedure of shipping the meters and venting conduits under separate covers, field assembly of the parts is required which is time consuming, expensive and often results in damaged, inaccurate or inoperative equipment.

The instant invention overcomes the problems, aforenoted, and provides a gas meter wherein the venting conduit is formed integral with the pressure regulating device and is completely contained within the confines of the area defined by the basic meter structure.

Accordingly, it is an object of the invention to provide a gas meter, of the type which includes a meter casing and a pressure regulating device, which may be inexpensively packed and shipped in assembled condition to its destination.

It is also an object of the invention to provide a gas meter which may be packed in a single standard container, in assembled condition, and shipped to its destination, for use, without the necessity of burdensome additional field assembly.

Another object of the invention is the provision in a pressure regulating device, of a cover dome having an integrally formed self-contained venting conduit extending outwardly therefrom a distance no greater than the area defined by the side walls of the gas meter casing.

Another object of the invention is the provision, in a pressure regulating device, of a cover dome being formed with an integral self-contained venting conduit extending outwardly therefrom a distance no greater than the area defined by the side walls of the gas meter casing and having an integral trap means cooperating with the conduit for trapping water entering therethrough.

Still another object of the invention is to provide in a cover dome, for a pressure regulating device, an integral venting conduit, which extends outwardly thereof a distance no greater than the area defined by the walls of the meter casing, having means therein for controlling the venting therethrough such that harmonic pulsations, inherent in an operating regulating device, are dampened.

A further object of the invention is to provide a cover dome, for a pressure regulating device, which is provided with an integral outwardly extending venting conduit being formed with a passage communicating with the venting chamber of the device and a plurality of venting openings communicating the passage to the atmosphere.

A still further object of the invention is to provide a cover dome, for a pressure regulating device, which is of simple structure, inexpensive, readily manufactured by quantity production methods and of such rugged character it will function over long periods of time with freedom from all difficulties.

With these and other objects in mind, reference is had to the attached sheet of drawings, illustrating one form of the invention, wherein like characters represent like parts, and in which:

Figure 1 is a side elevational view, broken away and partially in section, of a gas meter embodying the invention;

Fig. 2 is a bottom plan view of a cover dome structure according to the invention;

Fig. 3 is a top plan view of the cover dome structure of Fig. 2;

Fig. 4 is a fragmentary cross-sectional view of a cover dome mounted in operable position on a pressure regulating device; and Fig. 5 is a plan view of a means for controlling the venting through a venting conduit.

The invention is a unitary self-contained cover dome for closing and venting the venting chamber of a pressure regulating device. It is contemplated that the dome will be formed with an integral venting conduit extending outwardly therefrom a distance no greater than the area defined by the casing walls of the meter to which the device is attached, and with integral means for trapping water entering the chamber through the conduit. The invention includes means cooperating with the venting conduit for controlling the venting therethrough, whereby the harmonic pulsations inherent in an operating pressure regulating device are diminished.

Referring now to the drawings for a more detailed description of the invention, a gas meter generally indicated by the numeral 10 is shown. The gas meter, which includes a gas meter casing 11 mounting a pressure regulating device 12, is of the type commonly utilized for indicating the quantity of gas consumed in a particular service. The casing 11, which may conveniently be cast or similarly formed from iron, steel, aluminum or like material, includes a center casing member 13 having front and back cover members 14 and 15, respectively, secured thereto by means of bolts 16 or other securing means. Inlet and outlet conduits 11a, of any commonly known type, are provided for facilitating the passage of the gas being metered into and out of the meter structure. The pressure regulating device 12, which may be of any conventional type, is mounted on center member 13 of meter casing 11 by bolts 17 and includes a regulator casing 18 having a bottom casing member 19 and a cover dome 20 secured thereto by machine screws or bolts 21. In accordance with conventional regulator construction, a pressure responsive diaphragm 22 is mounted within regulator casing 18 between bottom member 19 and cover dome 20 to divide the casing into a pressure chamber 23 and a venting chamber 24. Spring-loading means 25 are operably connected to diaphragm 22 and extend upwardly into the cover dome for connection thereto as indicated at 26.

It will be understood by those conversant with the pressure regulating art that means must be provided in the regulating device 12 for venting the venting chamber 24 to the atmosphere. As was previously explained, the prior art regulating devices were vented by attaching a venting conduit to the cover dome. These conduit attachments, though they functioned properly, when installed were difficult to handle, due to their size and awkward shapes, and presented serious difficulties in packing and shipping the complete gas meter; it was found that, to avoid utilizing expensive oversize shipping containers, the gas meter and conduit attachment had to be shipped to their final destination under separate covers. Aside from the additional packing and shipping expenses incurred as a result of this procedure, the necessity for field assembling the parts was a problem.

The instant invention overcomes the problem of properly venting the venting chamber 24 of the regulating device 12 by providing, as an integral part of cover dome 20, a self-contained venting conduit 27. The venting conduit, which extends outwardly of the cover dome a distance no greater than the area defined by the side walls of meter casing 11, as in the illustrated embodiment of the invention, side wall 15, is formed with a passage 28 communicating with the venting chamber 24 and a pair of vent openings 29 communicating the passage to the atmosphere. The passage 28, which fans out from the center of cover dome 20, is defined by top conduit wall 30, side walls 31, bottom conduit wall 32 and outer conduit wall 33. Cylindrical walls 34 formed integral with outer wall 33 and substantially perpendicular to top wall 30, define vent openings 29. A water trap 35 is formed integral with cover dome 20 within passage 28 adjacent vent openings 29 for trapping water entering venting chamber 24 therethrough. The water trap, which is adapted to accumulate the water, such as rain entering the regulating device through vent openings 29, and prevent deterioration and destruction of the operating parts of the device, comprises outer conduit wall 33, bottom conduit wall 32 and a wall portion 36 extending between side walls 31 of the conduit.

Directing our attention now to Figs. 4 and 5 of the drawings, it will be noted that means 37 are provided in vent openings 29 for controlling the venting therethrough such that the harmonic vibrations which are inherent in an operating pressure regulating device are dampened. The means for controlling the venting through vent openings 29 is a flat flexible membrane 38 formed with an aperture 39 and having a plurality of slits 40 extending radially outwardly therefrom to form a variable opening therein. One diaphragm is adapted to be inserted within each vent opening, to abut a shoulder 41 formed on the inner surface of cylindrical wall 34, and is retained in such position by an annular angle bracket 42 which frictionally engages the inner surface of wall 34 or is secured therein by any other means known to the art.

It is contemplated that a cup shaped screen member 43 will be disposed in each of the vent openings 29, outwardly of the control diaphragm 37, for preventing the passage of insects or similar foreign objects into the venting chamber 24 of the regulating device 12. The screen 43 may conveniently be connected to annular bracket 42 or may be frictionally retained in position within the vent opening.

Thus, among others, the several objects of the invention as aforenoted are achieved. Obviously, numerous changes in the structure may be resorted to without departing from the spirit of the invention as defined by the claims.

I claim:

1. A cover dome structure for venting and dampening harmonic pulsations inherent in the operation of a regulator and adapted to be mounted on top of and close a venting chamber of a pressure regulating device forming a part of a meter casing with the dome lying within the area defined by the walls of the meter casing, said cover dome comprising a body portion having an integral conduit projecting from the edge of the body and opening downwardly, means for trapping water entering said conduit whereby deterioration is prevented, and means within said downwardly opening conduit for controlling fluid flow therethrough.

2. A cover dome structure for venting and dampening harmonic pulsations inherent in the operation of a regulator and adapted to be mounted on top of and close a venting chamber of a pressure regulating device forming a part of a meter casing with the dome lying within the area defined by the walls of the meter casing, said cover dome comprising a body portion having an integral conduit projecting from the edge of the body and having a pair of juxtaposed downwardly facing vent openings therein, trap means formed integral with and on the inner surface of said cover dome adjacent said vent openings to trap water entering said conduit, whereby deterioration is prevented, and means within said vent openings for controlling fluid flow therethrough.

3. A cover dome structure for venting and dampening harmonic pulsations inherent in the operation of a regulator and adapted to be mounted on top of and close a venting chamber of a pressure regulating device forming a part of a meter casing with the dome lying within the area defined by the walls of the meter casing, said cover dome comprising a body portion having an integral conduit projecting from the edge of the body and having a fan-shaped passage therein terminating in a pair of juxtaposed downwardly facing vent openings therein, trap means formed integral with said cover dome adjacent said vent openings to trap water entering said conduit, whereby deterioration is prevented, and means within said vent openings for controlling fluid flow therethrough.

4. A cover dome structure for venting and dampening harmonic pulsations inherent in the operation of a regulator and adapted to be mounted on top of and close a venting chamber of a pressure regulating device forming a part of a meter casing with the dome lying within the area defined by the walls of the meter casing, said cover dome comprising a body portion having an integral conduit projecting from the edge of the body and having a pair of juxtaposed downwardly facing vent openings therein, trap means formed integral with said cover dome adjacent said vent openings to trap water entering said conduit, whereby deterioration is prevented, and a flat flexible membrane being formed with an aperture and having a plurality of slits extending radially outwardly therefrom to form a variable opening therein disposed within each of said vent openings for controlling fluid flow therethrough.

References Cited in the file of this patent

UNITED STATES PATENTS

| | | |
|---|---|---|
| 1,367,164 | Miller | Feb. 1, 1921 |
| 1,411,228 | Taylor | Mar. 28, 1922 |
| 2,255,219 | Hutchinson | Sept. 9, 1941 |
| 2,581,071 | Born | Jan. 1, 1952 |
| 2,619,983 | Roberts | Dec. 2, 1952 |
| 2,620,087 | Peterson | Dec. 2, 1952 |
| 2,634,088 | Niesemann | Apr. 7, 1953 |
| 2,664,674 | Niesemann | Jan. 5, 1954 |
| 2,813,543 | Todd | Nov. 19, 1957 |
| 2,864,395 | Parr | Dec. 16, 1958 |